United States Patent
Robertson

(10) Patent No.: US 9,953,358 B1
(45) Date of Patent: Apr. 24, 2018

(54) BEHAVIORAL FILTER FOR PERSONALIZED RECOMMENDATIONS BASED ON BEHAVIOR AT THIRD-PARTY CONTENT SITES

(71) Applicant: Amazon Technologies, Inc., Seattle, WA (US)

(72) Inventor: Martin Christopher Hare Robertson, Scotland (GB)

(73) Assignee: Amazon Technologies, Inc., Seattle, WA (US)

(*) Notice: Subject to any disclaimer, the term of this patent is extended or adjusted under 35 U.S.C. 154(b) by 727 days.

(21) Appl. No.: 14/563,628

(22) Filed: Dec. 8, 2014

(51) Int. Cl.
*G06Q 30/00* (2012.01)
*G06Q 30/06* (2012.01)

(52) U.S. Cl.
CPC .............................. *G06Q 30/0631* (2013.01)

(58) Field of Classification Search
CPC ......................................... G06Q 30/06–30/08
USPC .............................................. 705/26.1–27.2
See application file for complete search history.

(56) References Cited

U.S. PATENT DOCUMENTS 8,396,760 B1* 3/2013 Bradley ................ G06Q 30/02
                                                              705/26.1
8,473,369 B2     6/2013 Bradley et al.
2008/0294617 A1* 11/2008 Chakrabarti ...... G06F 17/30867

OTHER PUBLICATIONS

Declaration of Prior Use, executed by David Turner, Principle Software Development Engineer, Amazon Technologies, Inc. on Feb. 23, 2015 in U.S. Appl. No. 14/563,628, 2 pages.

* cited by examiner

*Primary Examiner* — Ethan D Civan
(74) *Attorney, Agent, or Firm* — Knobbe, Martens, Olson & Bear, LLP

(57) ABSTRACT

This disclosure relates to selectively filtering seed behavior, e.g., user activity used to generate item recommendations, based on the availability of item classifications. Seed behaviors and catalog items may be associated with categories in an electronic catalog, and a particular seed behavior may be used to generate user recommendations if it is more recent than a user's last purchase in the category of the seed behavior. For example, a user's activity in the TV category, e.g., viewing various TV models, may not be used to generate recommendations if the activity occurred prior to the user's purchase of a TV. As a result, additional TVs may not appear in the user's recommendations following the purchase of a TV. However, if classification information is unavailable relating to the purchase, seed behavior may be filtered across a set of categories, not just the TV category to reduce the chance of less effective recommendations.

19 Claims, 9 Drawing Sheets

BEHAVIORAL FILTER FOR PERSONALIZED RECOMMENDATIONS BASED ON BEHAVIOR AT THIRD-PARTY CONTENT SITES

BACKGROUND

A variety of methods are known for detecting behavior-based associations (associations based on user behaviors) among items stored or represented in a database. For example, the purchase histories or item viewing histories of users may be analyzed to detect behavior-based associations between particular items represented in an electronic catalog (e.g., items A and B are related because a relatively large number of those who purchased A also purchased B). As another example, the network browsing histories of users may be analyzed to identify behavior-based associations between particular network sites and/or network pages.

The detected behavior-based associations may be used to assist users in locating items of interest. For example, in the context of an electronic catalog, when a user accesses a network resource, such as a network page, that is associated with an item, the resource may be supplemented with a list of related items. This list may, for example, be preceded with a descriptive message such as "people who bought this item also bought the following," or "people who viewed this item also viewed the following." The detected associations may also be used to generate personalized recommendations that are based on the target user's purchase history, item viewing history, search related behaviors, and/or other item selections.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION

I. Introduction

Figure 1A:
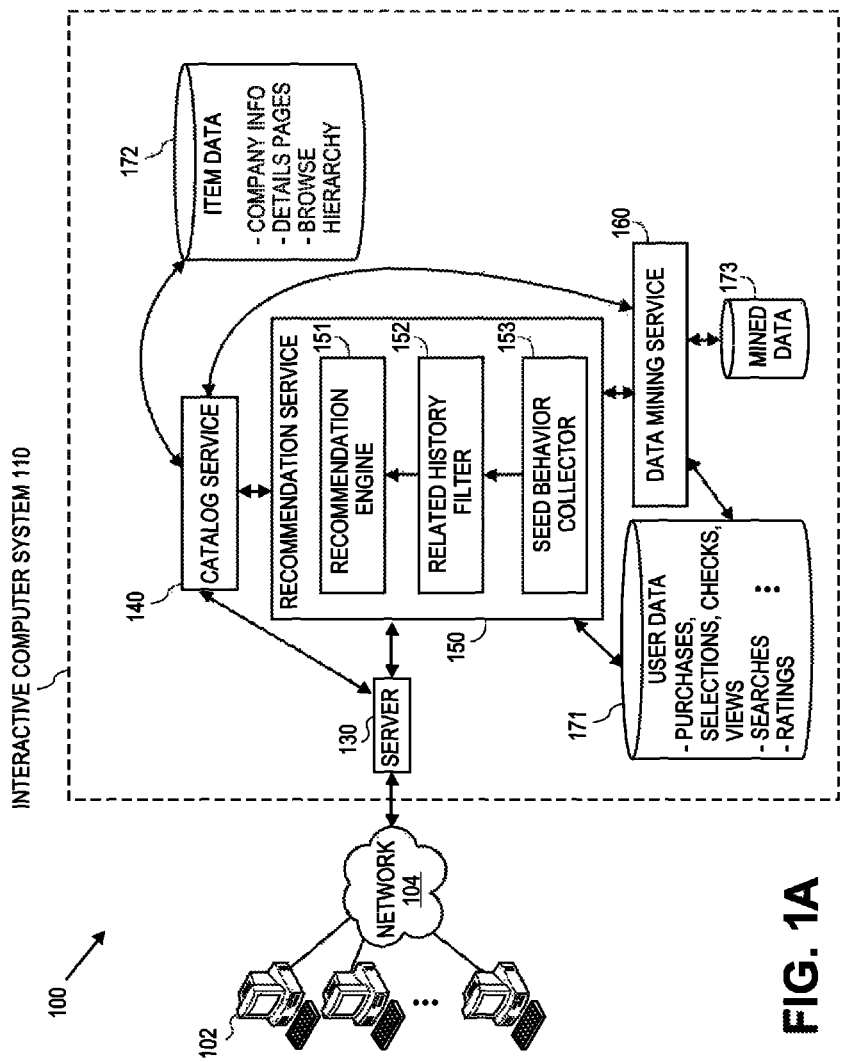
FIG. 1A illustrates an embodiment of a system for providing user recommendations.

Personalized recommendations can be generated for a user based on the user's interactions with an electronic catalog. These interactions may include purchases, item selections (e.g., page requests), category selections, searches, and the like. This catalog activity data can provide information about the user's interests, which in turn allows a recommendation system to find items that match or complement these interests.

When customized item recommendations are generated at least in part from user activity, further filtering of the results can sometimes improve the customer experience. For example, following a purchase, a user likely will not want to see the purchased item listed in her item recommendations. It can therefore be advantageous to remove from a list of items recommended to a user items that also appear in the user's purchase history. Such filtering, however, suffers from some notable shortcomings. For example, a user wishing to purchase a TV will likely view and consider various models before deciding which TV to purchase. Therefore, after purchasing a particular TV model, the user's catalog activity data may contain views, clicks, searches, and other behaviors directed to many different TV models. When such activity data is provided to a recommendation engine, the recommendation engine may generate a list of recommended items that includes various TV models, even when the purchased model is specifically removed from the list. The user, however, has already decided which TV to purchase and likely will not wish to see, at least for some period of time, other TV models in her recommendations.

In some cases, systems and associated methods may alleviate such shortcomings by selectively filtering seed behavior, e.g., user activity used to generate item recommendations. In some embodiments, seed behaviors and catalog items are associated with categories in an electronic catalog, and a particular seed behavior is used to generate user recommendations if it is more recent than a user's last purchase in the category of the seed behavior. For example, a user's activity in the TV category, e.g., viewing various TV models, may not be used to generate recommendations if the activity occurred prior to the user's purchase of a TV. As a result, in certain embodiments, additional TVs may not appear in the user's recommendations following the purchase, reflecting that the user has fulfilled a desire to purchase a TV.

In some cases, a first entity may generate recommendations or advertisements on behalf of a second entity, such as a subsidiary or a customer that purchases advertising services from the first entity. These advertisements may be generated by user activity occurring at a network site hosted by a system of the second entity. Often, the second entity will produce the user activity and related catalog information, such as item classifications, to the entity generating the advertisements. However, in some cases, the provided user activity or catalog information may be incomplete. The information may be incomplete because the second entity may want to prevent advertisements being generated for particular types of items. This may particularly be the case when the advertisements are presented on a third-party site, such as a news site or a casual video game site. One reason that the second entity may want to prevent particular types of advertisements is that the advertisements may be potentially embarrassing to some users. For instance, if a user viewed bras and purchased underwear on an ecommerce site, the user may appreciate an email with bra recommendations or a coupon. However, the user may not appreciate seeing an advertisement for bras on a news site while showing the user's child an article on the news site.

One solution to limiting the types of advertisements generated is to not base advertisements on user behavior. However, advertisements that are not particular to a user tend to be less effective than personalized recommendations for some users. Another solution is to not generate advertisements for user behavior related to particular item categories by filtering user behavior for the identified categories. Although this approach can be effective in some cases, it is less effective in cases where the content site does not share classification information or item identity information for some types of items (e.g., underwear) due, for example, to the desire to not share information relating to some item categories.

Systems and methods presented herein improve the generation of recommendations and the generation of advertisements by filtering user behavior. The systems may filter user behavior for an item category of an item purchased by the user. Further, the systems may filter user behavior across all categories or a set of item categories when the item category for a purchase, or other seed behavior, cannot be identified. Recommendations and/or advertisements can be generated based on the remaining user activity or the filtered user activity.

In some cases, a user may continue to browse items after a purchase for a period of time. Further, some items may be miscategorized or included in multiple categories because, for example, of a feature of the item relating to another item category than the item itself. For instance, a graphic tee-shirt with an image of a television may be categorized under television or under both clothing and television. Thus, in some cases, user behavior may be filtered across item categories for a time period even when an item category for the purchased item is determined. In some such cases, user behavior may be the user behavior related to the purchased item category may be filtered for a greater time period than the user behavior related to the other item categories related to user behavior. Further, in some cases, user behavior may be filtered for a period of time after the item purchase event. Advantageously, in certain embodiments, by filtering item behavior across item categories for a period of time, items that are miscategorized may be prevented from being recommended when a user has purchased an item of the same type.

For purposes of illustration, the systems and processes disclosed herein are described primarily in the context of an interactive computer system that provides users with access to, and recommendations from, a catalog of items on an e-commerce network site. As will be apparent, however, the disclosed systems and processes may also be used in other types of systems, and can be used to recommend other types of items, such as but not limited to web sites, news articles, blogs, podcasts, travel destinations, service providers, other users (e.g., as potential friends in a social network), events, discussion boards, photos and other images, online videos, tagged items, advertisements, and user-generated lists of items. In addition, the disclosed systems and processes need not be implemented as part of, or in conjunction with, a network site.

The term "item" is used interchangeably herein to refer to an item itself (e.g., a particular product, service, bundle of products or services or any combination thereof) and to its description or representation in a computer system. As will be apparent from the context in which it is used, the term is also sometimes used herein to refer only to the item itself or only to its representation in the computer system.

II. System Overview

FIG. 1A depicts an embodiment of a network environment 100 capable of providing personalized recommendations to users. In the depicted embodiment, the accuracy of personalized recommendations may be improved by a related history filter 152. The related history filter 152 may selectively filter seed behaviors used by the recommendation engine 151 to generate personalized recommendations.

In the environment 100, users can access an interactive computer system 110 with user systems 102. The user systems 102 that access the interactive computer system 110 can include, for example, computing devices, such as desktop computers, laptop computers, tablets, personal digital assistants (PDAs), mobile phones, electronic book readers, other wireless handheld devices, set-top or other television boxes, media players, video game platforms, kiosks, and/or the like. The user systems 102 access the interactive computer system 110 over a network 104, which can be a local area network, a wide area network (such as the Internet), or any other medium of computer data transfer.

The interactive computer system 110 can be implemented with one or more physical servers or computing machines. Thus, each of the components depicted in the interactive computer system 110 can include hardware and/or software for performing various features. In some implementations, the interactive computer system 110 may include specialized hardware for performing one or more processes described herein. For example, in some cases, the recommendation service 150 may be implemented using specialized hardware dedicated to generating recommendations and/or advertisements based on user activity with respect to an electronic catalog. In one embodiment, the interactive computer system 110 is a network site that allows users to interact with a catalog of items.

In the depicted embodiment, the interactive computer system 110 includes several components that can be implemented in hardware and/or software. For instance, the interactive computer system 110 includes one or more servers 130 for receiving, processing, and responding to requests from user systems 102. The one or more servers 130 can include web servers, application servers, database servers, or other types of servers. The servers 130 can be geographically co-located or geographically dispersed.

The one or more servers 130 access information about items in an electronic catalog by communicating with a catalog service 140. The catalog service 140 provides access to an item database 172 that may store information about an item catalog, including item details, item categories, item relationships, item ratings, customer reviews, author pages, user-generated list pages, forum pages, blog pages, and the like. In one embodiment, at least some of this content is arranged in a hierarchical structure, having items associated with one or more categories or browse nodes in a hierarchy. The catalog service 140 can provide functionality for users to browse pages in the item hierarchy in addition to searching the catalog. Users can select an item represented in the hierarchy or in a list of search results to view more details about an item.

The interactive computer system 110 may further include a data mining service 160 that generates and provides access to mined data 173. Mined data 173 may include item association tables and datasets that store information about item associations and/or relationships. The data mining service 160 may generate mined data 173 by analyzing users' purchase histories, item viewing histories, or other user activity data, and detecting and quantifying behavior-based associations between specific items. For instance, if purchase histories are used, item A may be mapped to item B in a purchase-based associated items table if a relatively large number of the users who purchased item A also purchased item B. More generally, associations can be based on correlating any activities made by users, and not just purchase activities (e.g., search, viewing, etc.).

Associations between items may, for example, be used to detect items that are substitutes for and items that are complementary to each other. Complementary items, for example, may be detected by analyzing user purchase history: items that are often purchased together or in succession may be complementary. On the other hand, items that are substitutes for one another may be detected by analyzing user browsing activity: items that often are viewed together or in succession, such as items viewed during a single browsing session, may be substitutes for one another. As an example, if dishes and utensils are often purchased together, these items may be complementary; if various microwave models are viewed in succession—activity that may indicate systematic evaluation of various alternatives—these items may be substitutes for one another. Other logical or function relationships may also be detected based on user activity data.

The interactive computer system 110 may also include a recommendation service 150 that assembles and provides to the one or more servers 130 a list of items that may be of interest to a user. The recommendation service 150 may include a recommendation engine 151, a related history filter 152, and a seed behavior collector 153.

The seed behavior collector 153 may retrieve from a user database 171 seed behavior information, including user activity information, which may be used to generate recommendations for a user. User activity information may include information such as a user's purchases, selections, clicks, views, searches, ratings, page requests, additions of items to wish lists and shopping carts, user interface events, tagging activity, combinations of the same, and/or the like. The seed behavior collector 153 may pass the assembled seed behavior information to the related history filter 152.

The related history filter 152 may analyze and selectively filter at least some of the seed behavior information that is related to one or more of a user's purchases. For example, the related history filter 152 may filter recent browsing behaviors that led to a user's recent purchase. In some embodiments, purchases and seed behaviors may have associated categories, and seed behaviors that occurred prior to a user's most recent purchase in the category of the seed behavior are filtered. In other embodiments, all seed behaviors, regardless of category, that occurred prior to a user's most recent purchase are filtered. The filtered seed behaviors may be removed from a list of seed behaviors; alternatively, the filtered seed behaviors may be flagged, weighted, modified, moved to another list, reduced in priority, or otherwise attenuated. Seed behavior filtering may reduce the likelihood that the user continues to receive recommendations for items similar to those she purchased despite having completed her purchase goal.

The related history filter 152 may pass the filtered information to the recommendation engine 151, which uses the filtered information to generate recommendations for a user. In addition to the filtered activity information, the recommendation engine 151 may also use information provided by the data mining service 160 to generate recommendations. The recommendation engine 151 may use any of a variety of algorithms for generating recommendations. One such algorithm is to recommend items to the user that the user previously viewed or selected while browsing. Of these browsed-for items, those related to a purchase can be filtered out by the related history filter 152. Other recommendation algorithms can recommend items that are related to items the user browsed for or purchased.

For example, the recommendation engine 151 may use mined data 173 generated by the data mining service 160 to determine item associations. The recommendation engine 151 may then use item associations to recommend items that are substitutes for or that are complements to items in a user's activity data, such as recently viewed items, or items that are complements to recently purchased items, or the like. The recommendation engine 151 may perform these and other algorithms described in greater detail in U.S. Publication No. 2002/0019763, filed Mar. 29, 2001, and titled "Use of Product Viewing Histories of Users to Identify Related Products," the disclosure of which is hereby incorporated by reference in its entirety.

In some embodiments, the recommendation engine 151 generates recommendations for items that are substitutes for or that are complements to items viewed in a user's current browsing session. Recommendation engine 151 may also use probabilistic selection or scoring methods to effectively introduce noise into selected recommendations, causing the recommendations to vary in a controlled manner between recommendation access events. Further still, recommendation engine 151 may use data from third-party content providers, for example, a user's activity on a social network, to generate recommendations. The recommendation service may 150 provide recommendations generated by the recommendation engine 151 to the one or more servers 130. The one or more servers 130 may provide the recommendations to the user.

It should be noted that the processing of the various components of the interactive computer system 110 can be distributed across multiple machines, networks, and other computing resources. The various components of the interactive computer system 110 can also be implemented in one or more virtual machines, rather than in dedicated servers. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Figure 1B:
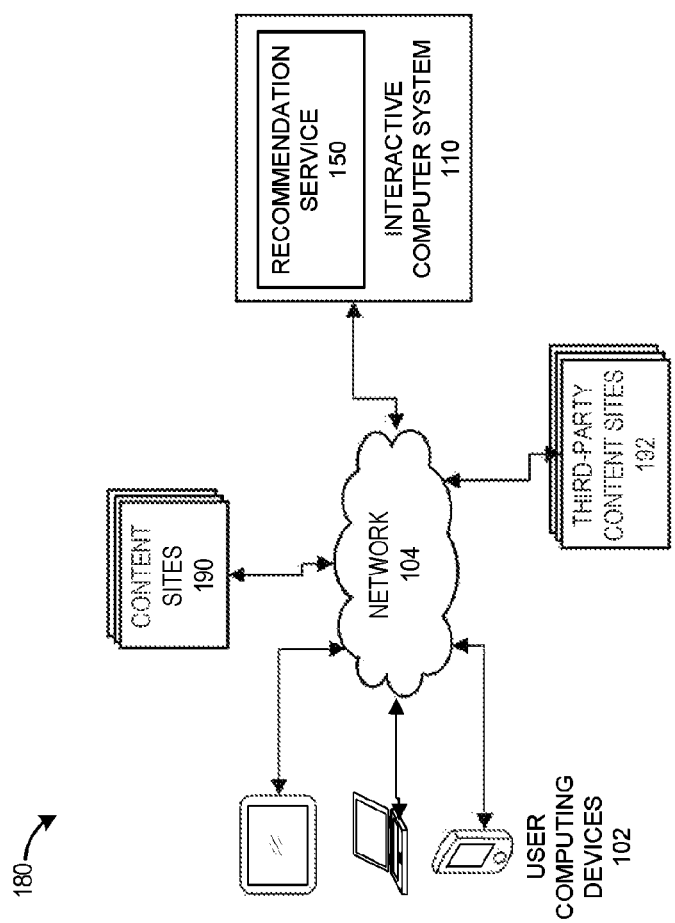
FIG. 1B illustrates an additional embodiment of a system for providing user recommendations.

FIG. 1B illustrates an additional embodiment of a network environment 180 for providing personalized recommendations to users. In the depicted embodiment, the recommendations provided by the recommendation service 150 may be generated based on seed behavior information mined from user activity data performed at one or more of the content sites 190. The interactive computer system 110 may obtain the user activity data by accessing information provided by the content sites 190. This information may include the user activity data of users at the content sites 190 as well as information relating to content hosted by the content sites 190, including one or more electronic catalogs hosted by the content sites 190.

The content sites 190 may include one or more systems configured to provide access to one or more network sites. These network sites may provide access to electronic catalogs for purchasing, renting, or accessing data, items, or services. Further, in some embodiments, one or more of the content sites 190 may include or may be an interactive computer system, such as the interactive computer system 110.

Moreover, at least some of the content sites 190 may be associated with a different entity than an entity associated with the interactive computer system 110. In some cases, an entity affiliated (e.g., an owner or management entity) with a content site 190 may be unrelated to an entity affiliated with the interactive computer system 110. In other cases, there may exist a corporate relationship between the entities. For example, the entity affiliated or associated with the content site 190 may be a subsidiary of the entity affiliated or associated with the interactive computer system 110. In some cases, the entity affiliated with the content site 190 may have a contractual relationship with the entity affiliated with the interactive computer system 110. For example, the entity of the content site 190 may contract with the entity of the interactive computer system 110 to provide recommendations and/or advertisements to users of the content site 190.

As part of the relationship between the entity of the content site 190 and the entity of the interactive computer system 110, the content site 190 may provide access to at least some of the user activity data of users who use the content site 190. Further, the content site may provide access to at least some electronic catalog information for an electronic catalog hosted or maintained by the content site 190. This electronic catalog information may include information not publicly available to users or customers of the content site 190, such as item categorization information, inventory quantity information, inventory location information, and internal item identification information.

In some implementations, a content site 190 may provide information to the recommendation service 150 for some items, but not other items included in the electronic catalog of the content site 190. Further, the content site 190 may provide more information for some items than for other items. For instance, the content site 190 may provide information to the recommendation service 150 indicating that a user purchased a coat. This information may identify the coat and its related item category (e.g., outerwear). However, if the user also purchased underwear, the content 190 site may provide information indicating that the user completed a purchase transaction, but may not share information identifying the type of product purchased or the item's related item category.

Recommendations generated by the recommendation service 150 may be presented to a user in a number of ways. For instance, recommendations may be presented to a user via email or on a portion of a network page hosted by the interactive computer system 110 or one of the content sites 190. This network page may be viewed by the user as the user browses an electronic catalog hosted by the content site. 190. Alternatively, the recommendations may be presented as an advertisement on a third-party content site 192. These third-party content sites 192 may include any type of content site that may include space for advertising on a network page or that may display a separate network page for advertisements.

Typically, the third-party content sites provide content that differs from the type of content provided by the content sites 190 that use the recommendation service 150 to generate recommendations. For example, the content sites 190 may include e-commerce sites that sell clothing, media (e.g., books, movies, music), household items, restaurant food delivery, etc. The third-party content sites 192 may include news sites, streaming video, network-hosted games, etc. Although in some cases at least some third-party sites 192 may include similar types of items or services as some content sites 190, a third-party site 192 will typically not advertise items or items of a particular type for a particular content site 190 that are available from the third-party site 192.

III. Seed Behavior Filter Process

Figure 2:
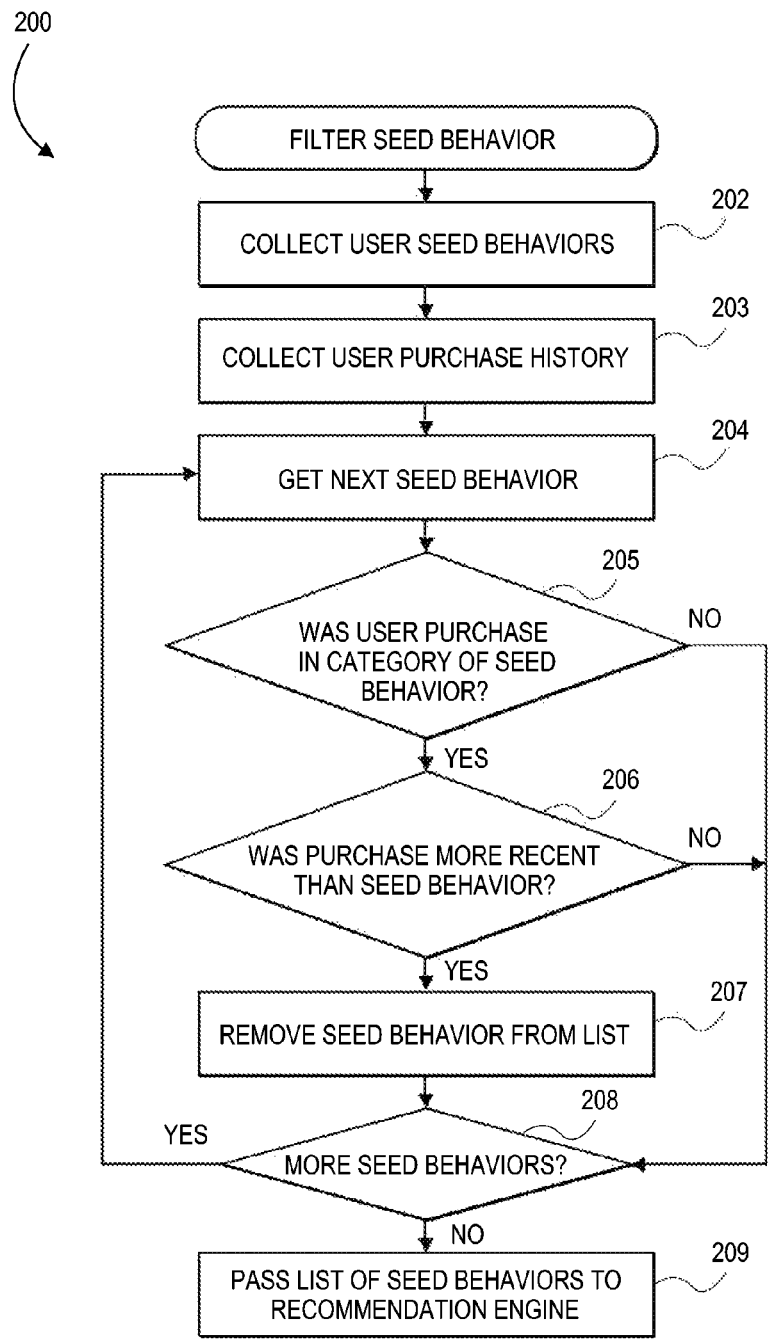
FIG. 2 illustrates an embodiment of a seed behavior filter process.

FIG. 2 illustrates an embodiment of a seed behavior filter process 200. As described above, seed behaviors such as user activity data may be used to generate personalized recommendations. Such seed behaviors may be selectively filtered to improve the effectiveness of generated recommendations. This selective filtering may be accomplished by the process 200. In some embodiments, the seed behavior filter process 200 is implemented by the interactive computer system 110. For example, the related history filter 152 can implement blocks 204 through 209 of the seed behavior filter process 200. The seed behavior collector 153 can implement blocks 202 and 203.

At block 202, user seed behaviors are collected. Such behaviors may, in some embodiments, be collected by the seed behavior collector 153 and may be collected according to various criteria. Seed behaviors may include information about user activities such as purchases, selections, clicks, views, searches, ratings, page requests, additions of items to wish lists and shopping carts, user interface events, and/or tagging activity, to name a few. The user database 171 may include details about such seed behaviors, such as a type of user activity that occurred (e.g., click, view, search, purchase, and/or the like); a category in which the activity occurred; date, time, and/or session information related to the user activity; search terms used in a search query, combinations of the same, or the like.

At block 203, user purchase history is collected. In some embodiments, user purchase history is a subset of user seed behaviors, which, as described above, may include user purchases. In other embodiments, user purchase history is collected separately from seed behavior data. User purchase history may include information such as details about a purchased item, one or more categories in the electronic catalog associated with the purchased item, a date and time when the purchase occurred, pricing information, associated session information, combinations of the same, or the like.

In some embodiments, the interactive computer system 110 maintains longer purchase histories for users than browse histories because purchases may be more relevant to user behavior in the long term than browsing behavior. The collection of the user's purchase history at block 203 can therefore be limited to more recent purchase history in one embodiment. For example, in one embodiment the seed behavior collector 153 does not consider purchase histories made before the user's existing browse history begins.

Further, a user's purchase history can be collected from sources other than the user's purchase activities in the interactive computer system 110. The interactive computer system 110 may provide a user interface, for instance, that allows a user to report purchases that the user has made, including purchases made using other systems or offline. For filtering purposes, the interactive computer system 110 can consider the purchase date and/or time of these other purchases to be the date and/or time they are reported to the interactive computer system 110.

Moreover, a user's purchases on other network sites can be accessed programmatically by the seed behavior collector 153 in some implementations. The seed behavior collector 153 may include a mechanism for correlating user identities in the interactive computer system 110 with user identities on other network sites. The seed behavior collector 153 can query these network sites to obtain a user's purchase history and/or other activity data. An example mechanism for correlating user identities on other network sites is described below.

At blocks 204-208, one example approach for filtering the list of seed behaviors is shown. In this example, filtering is accomplished by individually analyzing and filtering each seed behavior or a set of seed behaviors. For example, at block 204, a seed behavior is retrieved for analysis from a list of seed behaviors. At block 205, it is determined whether the user has made a purchase in the same category as the seed behavior. If the user has not made a purchase in the same category as the seed behavior, process 200 continues to block 208, where it is determined whether there are more seed behaviors to analyze. If, on the other hand, the user has made a purchase in the same category as the seed behavior, process 200 continues to block 206.

At block 206, it is determined whether the purchase was more recent than the seed behavior. If the purchase was not more recent than the seed behavior, process 200 continues to block 208, where it is determined whether there are more seed behaviors to analyze. If the purchase was more recent than the seed behavior, the process 200 continues to block 207.

At block 207, the seed behavior that occurred before the purchase is removed from the list of seed behaviors. In some cases, only seed behavior that occurred less than a threshold period of time before the purchase is removed. In other cases, the seed behavior is removed regardless of how long ago the seed behavior occurred. Although the seed behavior is removed from the list of seed behaviors, it may persist elsewhere, for example, in user database 171 of interactive computer system 110. In other embodiments the seed behavior, instead of being removed from the list, is flagged, weighted, modified, moved to another list, or the like. In still other embodiments, seed behaviors that are not selected for removal are added to a new list of behaviors for generating recommendations, while seed behaviors selected for removal are not so added.

The process 200 continues at block 208, where it is determined whether there are more seed behaviors to analyze. If there are more seed behaviors to be analyzed, the process continues to block 204, where the next seed behavior is retrieved for analysis. If all seed behaviors have been analyzed, the process 200 continues to block 209.

At block 209, the list of seed behaviors is provided for generating recommendations. In some embodiments, the list of seed behaviors is provided to a recommendation engine such as the recommendation engine 151 in the interactive computer system 110.

IV. Variations of Seed Behavior Filter Process

In some embodiments, the aggressiveness of seed behavior filtering may be adjusted to be stricter than filtering seed behaviors related to a purchase category. For example, in one implementation, all seed behaviors (regardless of category) that occurred prior to a user's most recent purchase may be filtered. Such strict filtering may be appropriate, for instance, where there is a cost of presenting each recommended item to a user, such as when recommendations are presented in an advertising context (e.g., on third party network sites). In such a case, it may be preferable to favor exclusion of potentially relevant items over inclusion of items in which the user is no longer interested.

Filtering may also be made stricter by filtering seed behaviors in categories beyond those in which a user has made a recent purchase. For example, a list of items that are substitutions for a purchased item may be generated by the data mining service 160. Seed behaviors in the categories of these substitutions may then be filtered. Alternatively, the process may continue iteratively so that further substitutions of the substitutions are accessed and used to exclude seed behaviors in their categories. The iterative process may, for example, terminate when the numbers of excluded categories, the number of items in the excluded categories, or the degree of similarity of the excluded categories reaches a certain threshold.

In other embodiments, instead of filtering seed behaviors related to purchases, user recommendations generated based on such seed behaviors may be filtered after they are generated. The recommendation engine 151 may keep track of which source behaviors are used to generate each recommended item. The list of recommended items may then be filtered based on the user's seed behaviors. For example, if a user recently purchased a digital camera, recommendations generated from source behaviors occurring in the digital camera category may be filtered. The filtered recommendations may be removed, hidden, attenuated in priority, decreased in number or frequency, or the like.

Generated recommendations also may be filtered based on the category of the recommended item. For example, a recommended item may be filtered if it occurs in the same category as a user's purchase. Alternatively, a recommended item may be filtered if it occurs in the same category as a user's purchase and if the most recent seed behavior used to generated the recommendation occurred prior to the purchase. Further still, a recommended item may be filtered if it occurs in the same category as a user's purchase and if any seed behavior used to generate the recommendation occurred prior to the purchase. Filtered recommendations may be removed, reduced in priority, and/or otherwise attenuated. The degree of reduction in priority or attenuation may be based on the degree to which seed behaviors occurring prior to the purchase contributed to the recommendation.

In still other embodiments, some categories of seed behaviors or recommended items may be excluded from the filtering process. Such exclusion may be appropriate, for example, where a user might wish to purchase multiple items in a category. Such categories may include media items such as books, music, movies, video games, software, and the like. As an example, a user who has purchased a music CD might also be interested in purchasing other CDs by related artists. It may, therefore, be advantageous to exclude the music category from the filtering process so that additional, similar music items may be recommended to the user.

It should also be noted that although purchase-related seed behaviors are filtered out in certain embodiments, that some purchase-related recommendations may still be generated. For example, items that have complementary associations to items a user purchased may still be good candidates for recommendation, such as a camera case related to a recently-purchased camera. Thus, the user's actual purchases need not be filtered out of the set of seed behaviors for the user in some embodiments, at least for the purpose of obtaining complementary associations to such purchases. On the other hand, substitution-associated items, which may be similar to the items purchased (e.g., another brand of camera), may be filtered out of the recommendations.

Further, as mentioned above, recommendations can be provided in an advertising context, such as by the interactive computer system 110 providing advertisements on third party network sites. The recommendation service 150 of the interactive computer system 110 can generate targeted advertisements to users of other sites in one embodiment based on information regarding those users' browsing and purchase activities on those network sites. For instance, an agreement can exist between a provider of a third party network site and a provider of the interactive computer system 110 that allows the third party network site to share user data with the interactive computer system 110. The third party network site can provide data regarding user purchases and browsing activity to the interactive computer system 110, which can then return targeted advertisements that employ any of the purchase-related filtering concepts described herein. In addition, the third party network site and the interactive computer system 110 can provide or exchange user cookie information (or other user identifier information) to correlate the identities of users of both sites. The interactive computer system 110 can then generate recommendations or advertisements for users on third party sites based on their user activity with respect to the interactive computer system 110 instead of or in addition to their third-party network site activity.

V. Adjusting Seed Behavior Filter Process

Figure 3:
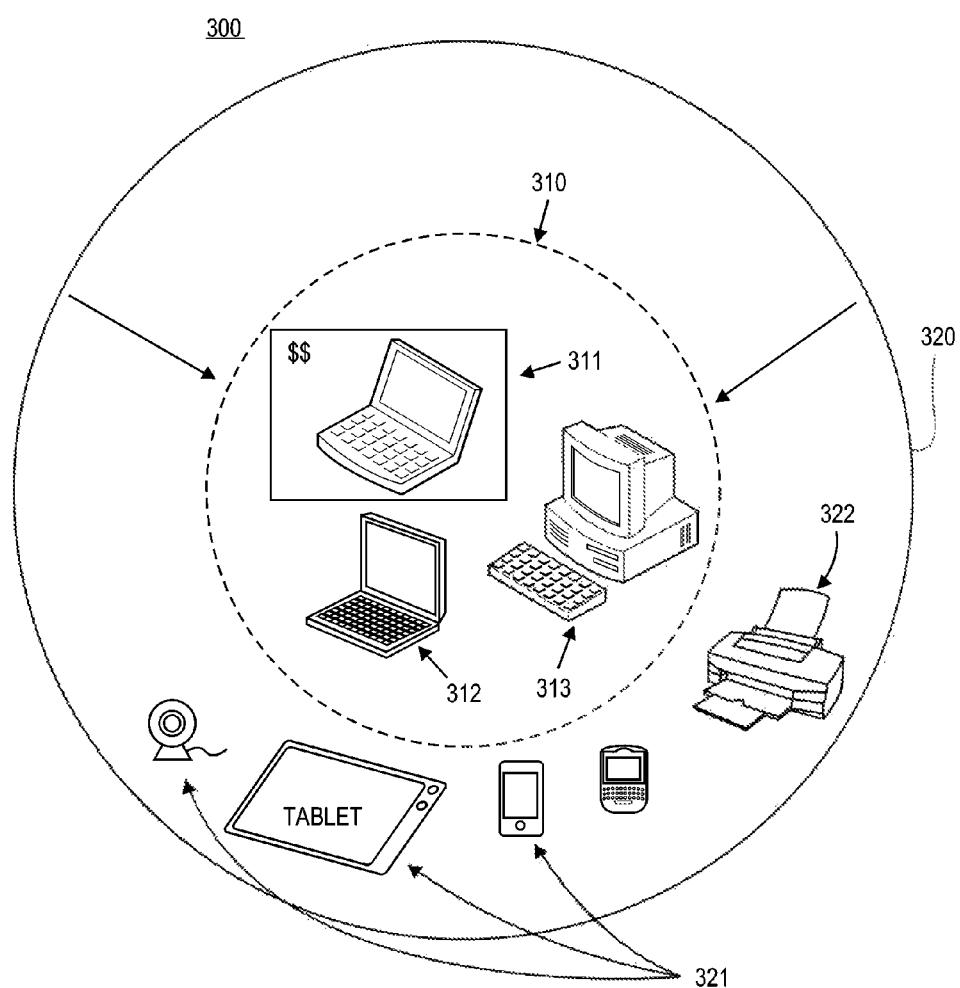
FIG. 3 illustrates an embodiment of a process of adjusting category designations.

FIG. 3 depicts an example scenario 300 that illustrates how, in certain embodiments, adjusting category designations may increase the effectiveness of generated recommendations.

In FIG. 3, a user has purchased a laptop 311. If the electronic catalog category of the laptop is defined as electronics 320, seed behaviors occurring in this category prior to the purchase may be filtered. However, as will be shown below, it may be more effective, in some embodiment, to filter seed behaviors based on a narrower category. For example, if the user viewed prior to the purchase of the laptop 311 a printer 322 that is also associated with the electronics category 320, this behavior might be filtered out, and the user might not receive any printer recommendations after purchasing the laptop 311. Having purchased a laptop, however, the user might still be interested in purchasing a printer. This shortcoming may be addressed by narrowing the category of the laptop 311.

If, for example, the category of the laptop 311 is narrowed to contain only computers, the resulting category 310 may not include seed behaviors directed to printers. Accordingly, such seed behaviors might not be filtered out, and the user's recommended items may include printers generated as a result of the user's pre-purchase interest in the printer 322. The user's recommended items, however, may not contain computers generated as a result of the user's pre-purchase interest in a desktop 313 or a different laptop 312, as these items occur in the narrower computer category 310 of which the purchased laptop 311 is also a member. This may increase the effectiveness of generated recommendations by reflecting both the user's desire to purchase computer accessories or other electronic devices and her simultaneous desire not to purchase another computer.

Figure 4:
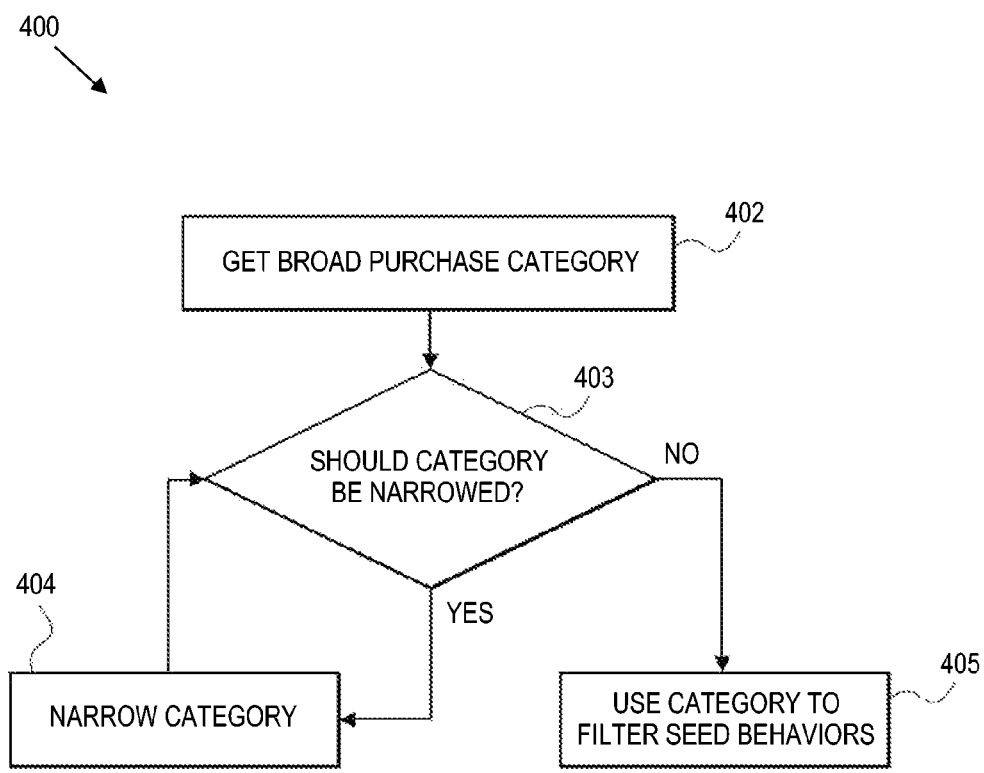
FIG. 4 illustrates an additional embodiment of a method for adjusting category designations.

FIG. 4 illustrates an embodiment of a process 400 for incorporating the category adjustment illustrated in FIG. 3. In the process 400, a category of a purchase may be determined. The process 400 may, for example, be implemented by the recent history filter 152 or the seed behavior collector 153.

In certain embodiments, such as that illustrated in FIG. 4, purchases and seed behaviors occur in multiple categories at different levels of a browse hierarchy. For example, a laptop 311 might be classified in the electronics category 320 and in the narrower computers category 310. The laptop 311 could further be classified in narrower categories (e.g., portable computers), broader categories, and/or intermediate categories.

To determine the category of a purchase used for filtering seed behaviors or recommendations, the purchase's broadest category, e.g., the category of the purchase that occurs at a relatively more general level of a browse hierarchy, may be determined at block 402. At block 403, it is determined whether to further narrow the category. In some embodiments, this determination may be made by checking whether users who purchase items in that category generally desire to purchase multiple items in that category. If they do, a narrower category may be selected for filtering purposes. In other embodiments, the determination may be made based on characteristics of the category, such as the functional or logical relationships of items in the category, the nature of the category or the items within it, the size of the category, the prices of items in the category, combinations of the same, or the like. In certain embodiments, the determination may be made by analyzing historical activity data of all users compiled, for example, by the data mining service 160.

If it is determined to narrow the category, the category is narrowed at block 404, for example, to the next level of a browse hierarchy, and the process continues back to block 403 with the narrowed category. If, on the other hand, the category is sufficiently narrow, the category may then be used to filter seed behaviors. In some embodiments, for example, seed behaviors occurring in the category, including seed behaviors occurring in the category but at lower levels of a browse hierarchy (e.g., in sub-categories of the category), may be filtered.

It should be noted that items and purchases may have multiple category designations, even at the same level of a hierarchy. For example, a carrying case for a digital camera might occur in both electronics and in electronics accessories. In such embodiments, seed behaviors may be filtered if they have one category in common with a purchase, if they have multiple categories in common with a purchase, and/or if they have all categories in common with a purchase.

It should also be noted that item catalog categories may be determined and/or equated with the help of human intelligence. For example, a human moderator may input a list of categories that are functionally equivalent for filtering purposes. For example, a moderator may decide that the high-end digital SLR cameras and compact camera categories within the more general digital camera category should be equivalent for filtering purposes. Such a determination may be appropriate because a user who decides to purchase an SLR, having decided which type of camera to buy, would likely not subsequently wish to purchase a compact camera.

VI. Example Network Site

Figure 5:
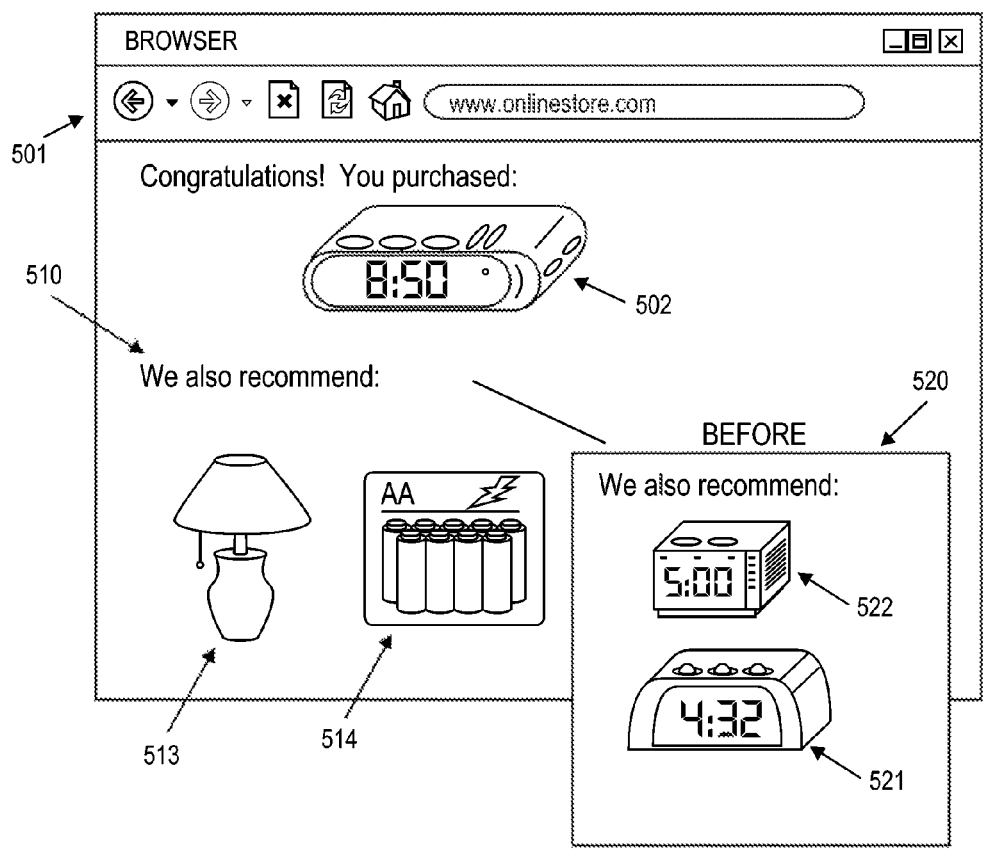
FIG. 5 illustrates an embodiment of a user interface for providing personalized recommendations.

FIG. 5 illustrates an embodiment of a user interface 500 that provides recommended items to users. In the depicted embodiment, the user interface 500 is show in the format of a network page. Recommendations need not be provided, however, in the form of a network page and may, for example, be provided by any other application, including a mobile application.

In FIG. 5, a user may access a network-based item catalog using a browser 501. In the example of FIG. 5, the user has purchased an alarm clock 502. The network site displays below the purchased item 502 a recommendation area 510, which contains items recommended for the user. Area 520 illustrates what the user's recommendations might look like if related history filtering is not applied. Although the user has already decided which alarm clock to purchase and has completed that purchase, the recommendations in area 520 include two additional alarm clocks, 521, 522. These recommendations may have been generated from the user's browsing activity directed to various alarm clock models, including the purchased model 502, in the alarm clock category. Likely, however, the user does not wish to purchase an additional alarm clock.

When related history filtering is applied, the recommendation engine may not rely on the user's activity, prior to the purchase, in the alarm clock category. Thus the recommendation area 510 may not include additional alarm clocks, and the user may find, following her purchase of alarm clock 502, recommended items 513, 514 more appropriate.

VII. Example Network Page Advertisement Process

Figure 6:
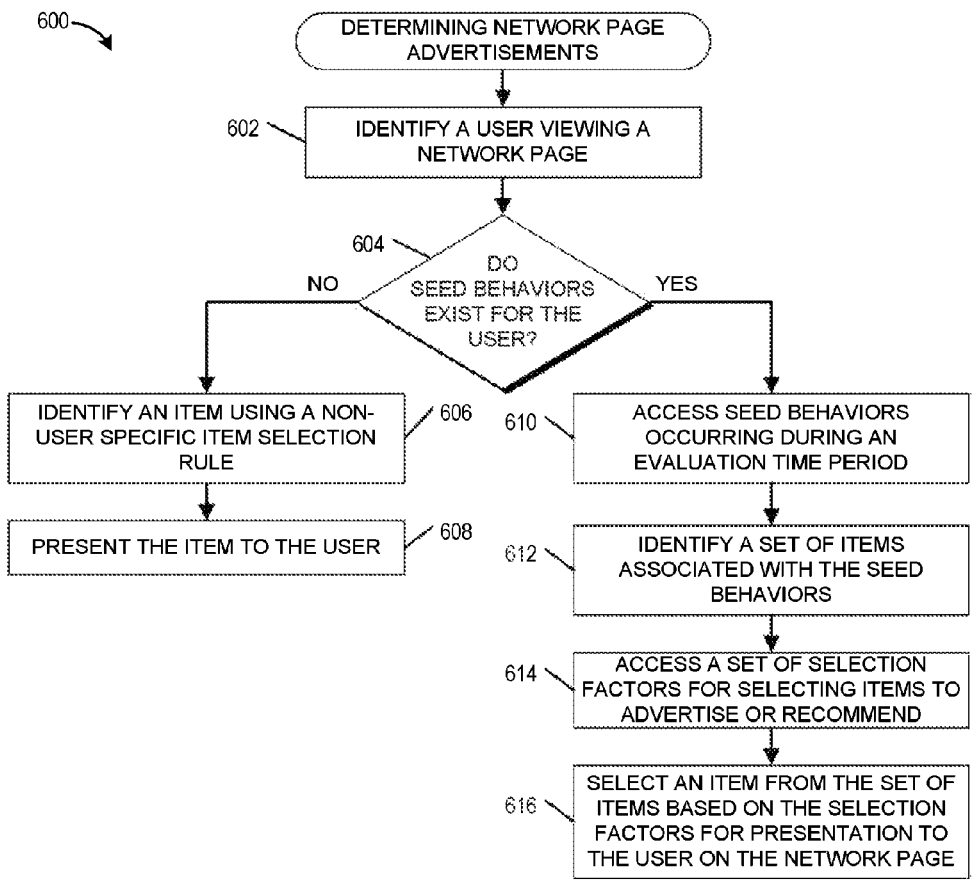
FIG. 6 illustrates an embodiment of a process of determining network page advertisements.

FIG. 6 illustrates an embodiment of a process 600 of determining network page advertisements. The process 600 can be implemented by any system that can generate a personalized recommendation for a user based on user activity by the user at a content site and that can include the personalized recommendation in an advertisement at another content site viewed by the user. For example, the process 600, in whole or in part, can be implemented by an interactive computer system 110, a recommendation service 150, a recommendation engine 151, a related history filter 152, or a seed behavior collector 153, to name a few. Although any number of systems, in whole or in part, can implement the process 600, to simplify the discussion, portions of the process 600 will be described with reference to particular systems.

In some implementations, the process 600 is performed by a system that hosts or is associated with a network site. However, in some implementations, the process 600 may be performed by the interactive computer system 110 on behalf of an independent content site, such as a third-party content site 192. In some such cases, the third-party content site 192 may host a network site that includes an advertising widget or that may include a portion of a network page for displaying an advertisement. One example of such a network site is described in more detail below with respect to FIG. 8.

The process 600 begins at the block 602 where, for example, the recommendation service 150 identifies a user viewing a network page. The network page may be hosted by a content site 190 that is using the interactive computer system 110 to generate recommendations or by a third-party content site 192 represents advertisements and behalf of the content site 190 or the interactive computer system 110. Further, the user may be identified based on user provided information, such as login information, or by accessing a piece of computer code or data, such as a cookie or browser cookie, stored on a user system 102 associated with the user.

At decision block 604, the seed behavior collector 153 determines whether seed behaviors exist for the user. The seed behaviors may include browsing activity by the user with respect to a network site. In some cases, the network site may include the network page viewed by the user at the block 602. In other cases, the network site may be independent from the network page viewed by the user at block 602. To determine whether seed behaviors exist for the user, the recommendation service 150 may access the user data repository 171 to determine whether repository seed behaviors or user activity data associated with the user.

If seed behaviors do not exist for the user, the recommendation engine 151 may identify an item for recommendation to the user based on non-user specific item selection rules. For example, the recommendation engine 151 may select an item based on its inclusion in a popular items list. As a second example, the recommendation engine 151 may select an item based on a conversion rate for the item. The conversion rate may identify how often an item is purchase compared to how often the item is recommended.

At the block 608, the recommendation service 150 presents the item, or item information associated with the item, identified at the block 606 to the user. Presenting the item to the user may include providing item information for the user to an advertising widget or other system for presentation to the user on the network page on the network page viewed by the user at the block 602.

If the seed behavior collector 153 determines that seed behaviors do exist for the user at the decision block 604, the seed behavior collector 153 access the seed behaviors occurring during an evaluation time period. The evaluation time period may include an entire time period during which the user interacts with the network site. In some cases, the evaluation time period may exclude time periods during which the user may have interacted with the network site anonymously or without the interactive computer system 110 or the network site being able to attribute the activity to the user. Further, in some cases the evaluation time period may include a subset of time during which the user an interactive with a network site, such as the most recent 30 days. Moreover, the seed behaviors accessed may be restricted to particular types of seed behaviors, such as item views or additions of items to a shopping cart. With respect to the present disclosure, item purchases may trigger filtering of seed behavior. However, in some cases, certain item purchases may be included as seed behavior and may not trigger the filtering of seed behavior. For example, the purchase of food, media, or other consumable that may be purchased with a threshold frequency may be included in the seed behavior.

At block 612, the recommendation engine 151 identifies a set of items associated with the seed behaviors. A set of items may be identified from an electronic catalog stored at the item data repository 172. The items included in the set of items may correspond to items associated with seed behaviors. For example, the set of items may include items viewed by the user or otherwise accessed by the user. As a second example, the set of items may include an item that is in the same item category as, or is otherwise related to, another item accessed by the user.

Further, at block 614, the recommendation engine 151 accesses a set of selection factors for selecting items to advertise or recommend to the user. The selection factors may include one or more factors for selecting an item to advertise or recommend from the set of items identified at the block 612. For example, the selection factors may include, for one or more items of the set of items, a conversion rate, a profit margin, and/or an inventory amount. Further, in some cases, the selection factors may include one or more user specific selection factors, such as how recently the user performed the seed behavior, user demographic information, and/or user-to-user relationships, such as the similarity between purchase history between the user and another user.

At block 616, the recommendation engine 151 selects an item from the set of items identified at the block 612 based on the selection factors accessed at the block 614. This item may be presented to the user on the network page viewed by the user at the block 602 as part of an advertisement. Further, presenting the item to the user may include the embodiments described with respect to the block 608.

In some cases, selecting an item from the set of items based on the selection factors may include selecting one or more items that satisfy a selection threshold. In cases where more than one item satisfies the selection threshold, and item that best satisfies the selection factors may be selected for recommendation. Alternatively, or in addition, an item may be selected at random from the items that satisfy the selection threshold. In yet other cases, the recommendation engine 151 may rotate through the set of items that satisfy the selection threshold as different network pages are visited that are configured to present an advertisement to the user. Thus, in such cases, as a user visits different network pages or refreshes a particular network page, advertisements for different recommended products may be presented to the user.

In some embodiments, one or more of the processes associated with the process 600 may be optional or omitted. For example, in some cases, if seed behaviors do not exist for the user, the blocks 606 and 608 may be omitted the process 600 may end. Further, in some cases the process 600 may be repeated for each location on a network page that is configured to present an advertisement to the user.

VIII. Example Process of Filtering Third-Party Seed Behavior

Figure 7:
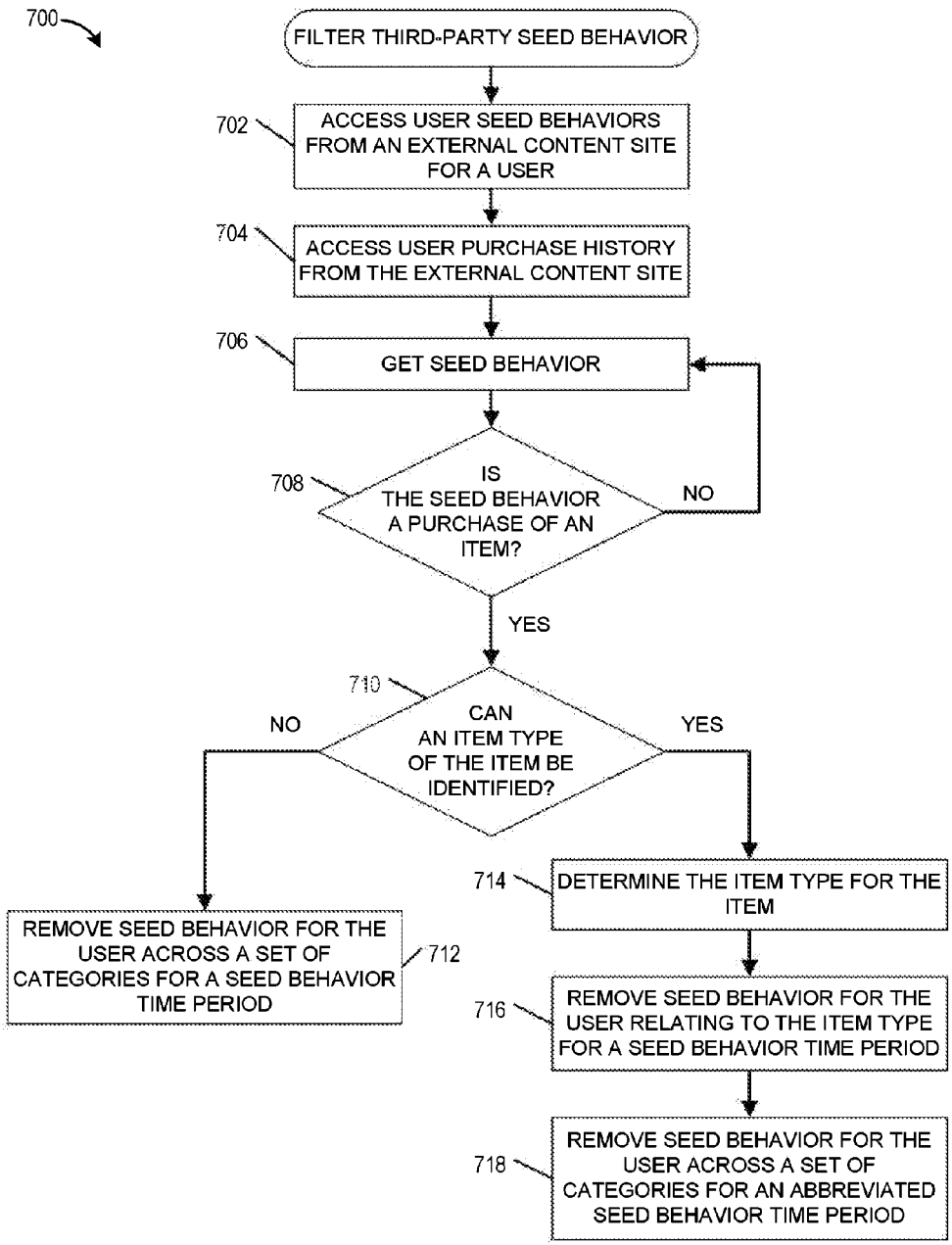
FIG. 7 illustrates an embodiment of a process of filtering third-party seed behavior.

FIG. 7 illustrates an embodiment of a process 700 of filtering third-party seed behavior. As described above (e.g., with respect to FIG. 2), seed behaviors such as user activity data may be used to generate personalized recommendations. The process 700 may be used to filter seed behaviors that may be provided by a third party, such as the content sites 190. The process 700 can be implemented by any system that can filter seed behavior from a content site. This filtered seed behavior may be used to generate a recommendation for inclusion in an advertisement on another content site using, for example, the process 600.

The process 700, in whole or in part, can be implemented by a number of systems including, for example, an interactive computer system 110, a recommendation service 150, a recommendation engine 151, a related history filter 152, or a seed behavior collector 153, to name a few. Although any number of systems, in whole or in part, can implement the process 700, to simplify the discussion, portions of the process 700 will be described with reference to particular systems.

The process 700 begins at the block 702 where, for example, the seed behavior collector 153 accesses user seed behaviors from an external content site, such as the content sites 190, for a user. The external content site may be a subsidiary of an entity associated with the interactive computer system 110 or a third-party content site. This third-party content site may be owned or managed by a different entity than the interactive computer system 110. In some cases, the third-party content site may contract with or have a relationship with the entity associated with the interactive computer system 110 for the purpose of obtaining recommendation services or advertisement services from the interactive computer system 110.

In certain embodiments, regardless of whether the external content site is a subsidiary or a wholly independent content site, information shared by the external content site may be limited. For example, the external content site may share a portion of user seed behaviors. As a second example, external content site may share some, but less than all of the information from its electronic catalog. For instance, assuming the external content site sells clothing, the external content site may share information relating to outerwear, shoes, and business clothes, but may not share information relating to the viewing or purchasing of clothing that some individuals prefer to keep right, such as underwear or certain types of sleepwear.

At block 704, the seed behavior collector 153 accesses user purchase history from the external content site. In some cases, the user seed behaviors include the user purchase history. Thus, the user purchase history may be obtained with the user seed behaviors at the block 702. Thus, in some cases, accessing the user purchase history may include accessing the user purchase history from the user seed behaviors. Alternatively, in some cases, the block 704 may be optional or omitted. Further, it should be understood that the user purchase history is not limited to purchases of items. For example, user purchase history may include the purchase of services, data, or news articles, and the like. Further, the user purchase history may include rentals, receipt of gifts, and any other type of access rights for an item or service, whether in exchange for currency or otherwise.

At the block 706, the related history filter 152 accesses a seed behavior from the user seed behaviors accessed or otherwise obtained at the block 702. In some cases, the block 706 may include accessing the user seed behaviors from the user data repository 171 by, for example, accessing a portion of the user data repository 171 associated with or assigned to the user. If there are no seed behaviors associated with the user, the process 700 may end.

At the decision block 708, the related history filter 152 determines whether the seed behavior is a purchase of an item. It should be understood that, in some cases, the decision block 708 may be a determination of whether the seed behavior is the obtaining of access rights with respect to the item. If the seed behavior is not a purchase of an item, the process 700 returns to the block 706 where the related history filter 152 accesses another seed behavior. If there are no additional seed behaviors to access for the user, the process 700 may end.

If the seed behavior is a purchase of an item, or the obtainment of access rights to an item, the related history filter 152 determines whether an item type of the item can be identified at decision block 710. Determining whether the item type of the item can be identified can include determining whether the related history filter 152 can identify an item category or other classification for the item. The related history filter 152 may identify the item type of the item accessing an electronic catalog, item classification information, or other item related information made available or supplied by the external content site. Further, the process of identifying the item type may include matching item related information for the item with information included in the electronic catalog or other information provided by the external content site.

In some cases, the item type of the item cannot be identified because, for example, identifying information for the item is not included in the seed behavior or is not provided by the external content site. Alternatively, or in addition, the item type of the item may not be identifiable because a portion of the electronic catalog, or other information provided by the external content site, relating to the item is excluded from information that the external content site makes available to the interactive computer system 110.

It is determined at the decision block 710 that the item type for the item cannot be identified, the related history filter 152 removes the seed behavior for the user across a set of categories for a seed behavior time period at block 712.

In some cases, removing the seed behavior for the user across a set of categories may include removing all seed behavior associated with the user for all item categories. Further, removing the seed behavior at the block 712 may include removing unclassified seed behavior, or seed behavior not associated with an item category. Generally, the set of categories include all item categories for which seed behavior associated with the user exists. However, in some implementations, the set of categories may be less than all of the item categories. For example, the set of categories may be limited to a particular subset of item categories, or may exclude one or more item categories. For instance, an item category that includes items that are purchased repeatedly, such as batteries, or on a relatively frequent basis (e.g., on a daily or weekly basis), such as milk or other food staples, may be excluded from the set of categories of block 712.

The seed behavior time period may extend from the first point in time at which the user interacted with the content site until the point in time at which the seed behavior occurred. Typically, the first point in time includes the first time that the user can be identified as interacting with the content site. Thus, in some cases, the user may have interacted with the content site prior to the first point in time but, because the user could not be identified (e.g., because the user had not registered with the content site), the prior interaction may be excluded from the determination of the first point in time during which the user interacted with the content site.

In some cases, the seed behavior time period may extend from the first point in time when the user interacted with the content site to a threshold period of time after the seed behavior occurred. This threshold period of time is not limited and may be five minutes, one hour, one day, or a period of time selected by the content site or an administrator. Advantageously, in certain embodiments, by extending the seed behavior time period beyond the occurrence of the seed behavior, related user activity that may occur after the seed behavior can also be filtered. For example, if the user views an item detail page for the item purchased by the user 30 minutes earlier, the seed behavior related to viewing the item detail page may be filtered from the user seed behaviors along with the item purchased seed behavior. Thus, in such a case, the viewing of the item detail page will not result in the item being recommended by the recommendation engine 151.

If it is determined that the item type for the item can be identified, the related history filter 152 determines the item type for the item. The item type may be identified by accessing an electronic catalog, or other information, made available by the external content site to the interactive computer system 110. Further, identifying the item type may include looking up or otherwise accessing item detail information for the item based on an identifier for the item included in the seed behavior. The item type may include an item category or other classification for the item.

At block 716, the related history filter 152 removes, or filters, seed behavior for the user relating to the item type for a seed behavior time period. Removing or filtering the seed behavior may include deleting or permanently removing seed behavior from the storage location associated with the user, such as from an entry associated with the user at the user data repository 171.

Alternatively, in some cases, the seed behavior may not be deleted, but may be identified as seed behavior to be excluded from a recommendation generation process or an advertisement generation process. In some cases, the filtered seed behavior may be removed for a particular recommendation generation process, but may be included for other recommendation generation processes. For instance, the seed behavior identified for removal may be used to generate recommendations that are provided via email, but excluded from the recommendation process used to generate recommendations that are advertised on a network site.

The seed behavior time period may be the same as the seed behavior time period from the block 712. Alternatively, the seed behavior time period from the block 716 may differ from the seed behavior time period of the block 712.

At the block 718, the related history filter 152 removes, or filters, seed behavior for the user across a set of categories for an abbreviated seed behavior time period. Typically, as filtering for a category related to the item type occurs at the block 716, the set of categories excludes the category associated with the item type identified at the block 714. Further, the set of categories may include all other item categories exclusive of the item category that includes the item type. In some cases, as described with respect to the block 712, the set of categories may be a subset of categories. In such cases, the subset of categories excludes one or more other categories in addition to the category of the item type. In some cases, the seed behavior related to the item type may be filtered for both the seed behavior time period and the abbreviated seed behavior time period. Although, in some cases, filtering the seed behavior related to the item type for both time periods may be redundant in other cases it is not. For example, the abbreviated seed behavior time period may extend beyond the seed behavior time period. For instance, the seed behavior time period may be from 1 week before a purchase event until 15 minutes after the purchase event, and the abbreviated seed behavior time period may be from 1 hour before the purchase event until 1 hour after the purchase event.

In some cases, the block 718 can improve recommendation generation by removing user behavior relating to items that are incorrectly categorized or that are misleadingly categorized. For example, suppose that a user was viewing televisions for purchase and purchases one of the viewed televisions. Advertising a television would likely not be useful once the user has purchased the television. Further, suppose that the content site includes a tee-shirt with a picture of a television, which the user may have viewed. The tee-shirt may be included in the television category because it includes the picture of the television as well as being included in the clothing category. By performing the processes associated with the block 716 and 718, both seed behaviors relating to the item purchased, the television, and seed behaviors viewed during the abbreviated seed behavior time period (e.g., viewing the tee-shirt) may be filtered.

As another example, a user may view ten pairs of shoes and purchase one. Nine of the pairs of shoes may be classified as shoes. However, the tenth pair, which the user did not purchase, may be classified as clothing. By filtering seed behavior that occurs in item categories other than the category for the purchase, an advertisement for the tenth pair of shoes may be omitted. Further, by restricting the filtering in the set of categories, other than the category for the item type, for an abbreviated seed behavior time period, seed behavior that occurs outside of the abbreviated filtering period may remain for generating other recommendations or advertisements (e.g., for items other than shoes).

The abbreviated seed behavior time period may be a subset of the seed behavior time period of the block 716. In some cases, the abbreviated seed behavior time period may include a period of time that is prior to the occurrence of the seed behavior in the period of time that is subsequent to the occurrence of the seed behavior. Both periods of time may be shorter than the corresponding period of time for the seed behavior time period of the block 716. Alternatively, in some embodiments, one of the time periods may be equal to or, in some cases, even longer for a corresponding time period of the seed behavior time period of block 716. For example, although the abbreviated seed behavior time period is shorter than the seed behavior time period, the abbreviated seed behavior time period may, in some cases, extend for a longer period of time after the occurrence of the seed behavior compared to the seed behavior time period of the block 716. In some implementations, the abbreviated seed behavior time period may include time prior to the seed behavior, but not time subsequent to the seed behavior. In some implementations, the abbreviated seed behavior time period partially overlaps the seed behavior time period, but may including a non-overlapping period of time. In other implementations, the abbreviated seed behavior time period occurs within the seed behavior time period and does not include a non-overlapping period of time. Generally, although not necessarily, the abbreviated seed behavior time period is short enough that not all seed behaviors are filtered out from the total set of seed behaviors associated with the user. Thus, it is still possible to generate at least some recommendations based on the remaining seed behaviors associated with the user.

The process 700 may be repeated for additional seed behaviors. Although not illustrated, after performing the block 718, the process 700 may perform the processes associated with the block 209. In other words, the process 700 can include providing the seed behavior remaining after the completion of the block 718 to a recommendation engine 151 to generate one or more recommendations. The one or more recommendations may be provided to a content site, such as one of the third-party content sites 192, for display in an advertisement. Advantageously, in certain embodiments, by determining whether to filter for a seed behavior time period or an abbreviated seed behavior time period across the set of categories based on whether the item can be identified, certain types of items may be excluded from recommendations or advertisements despite the interactive computer system 110 receiving imperfect or less than complete information from the external content site.

The process 700 has primarily been described with the assumption that an item is associated with a single item type. However, in some cases, an item may be associated with multiple types, categories, and/or tags. In some such cases, the process 700 may be used to filter seed behaviors based on whether none, some, or all of the items types associated with the purchased item can be determined. If the related history filter 152 determines at the decision block 710 that none of the item types, or other categorization information, can be determined for the item, the process 700 proceeds to the block 712. Similarly, if the related history filter 152 determines some an item type for the item, but also determines that additional categorization information exists for the item and that the additional categorization information is unknown, the process 700 proceeds to the block 712. Thus, if an item is associated with two item types, but only one can be determined, the process 700 proceeds to the block 712. On the other hand, if each of the item types can be determined for the item, the process 700 proceeds to the block 714. Determining the number of item types associated with an item may include querying an electronic catalog at a content site 190. Alternatively, or in addition, metadata associated with the item may specify the number of item types associated with the item whether or not the item types themselves can be determined.

In some cases, some item types may be subsidiary types or sub-types. For example, an item may be categorized as electronics and further may have item sub-categorizations of television and portable. In some such cases, if an item type is identified for an item, but sub-item types cannot be identified, the process 700 may proceed to the block 714 as if all item types were identified for the item.

IX. Example Network Page with Advertisements

Figure 8:
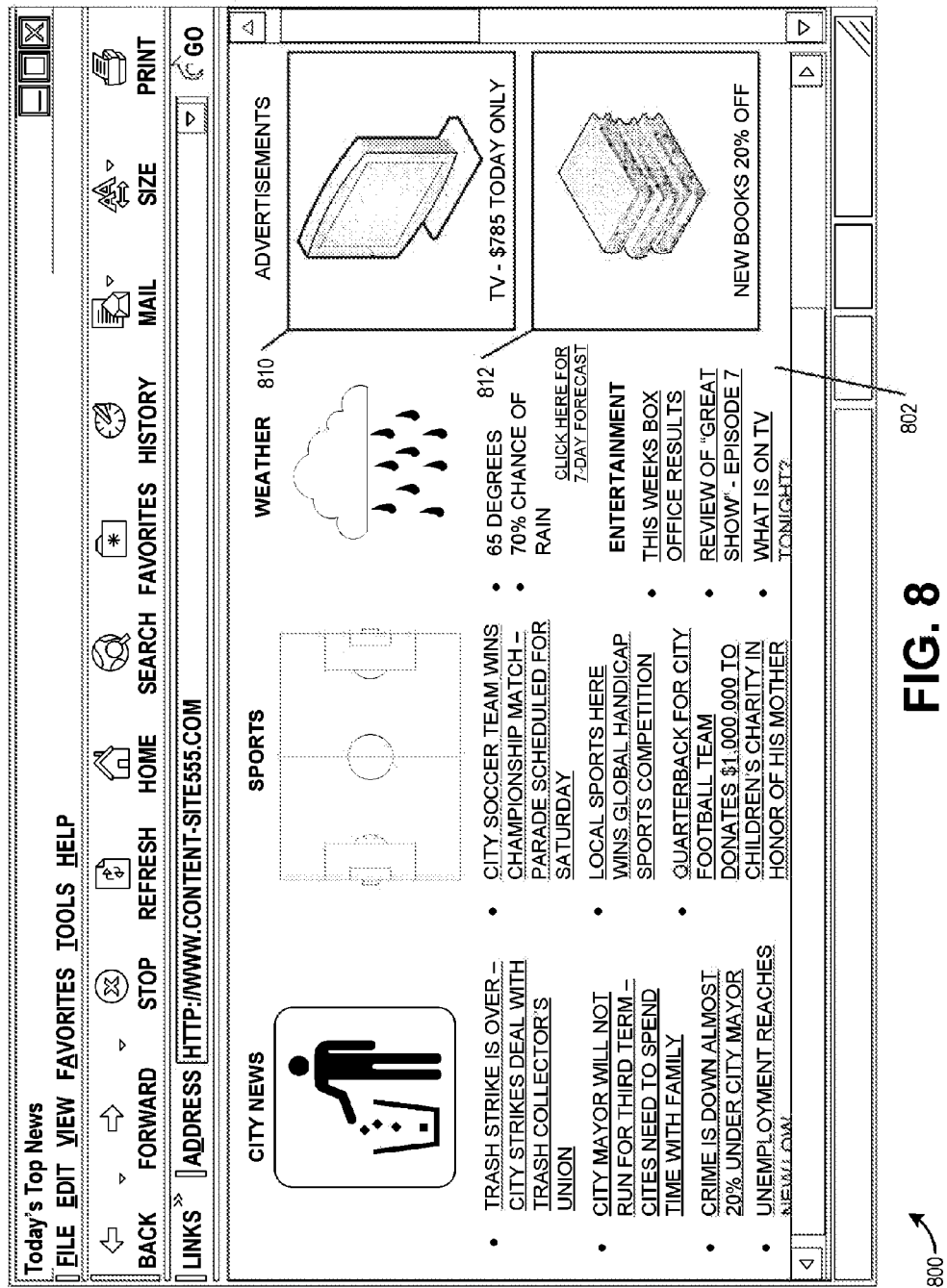
FIG. 8 illustrates an embodiment of a user interface for providing recommendations via advertisements on a network page.

FIG. 8 illustrates an embodiment of a user interface 800 for displaying recommendations via advertisements on a network page 802. The network page 802 may include any type of network page that may be hosted by a content site, such as the third-party content site 192. In the illustrated embodiment, the network page 802 is a news site. However, the network page 802 is not limited as such.

The network page 802 includes a pair of advertisements 810 and 812. These advertisements may be user-specific and may be generated based on a user's interaction with the content site that hosts the network page 802, or another network site, such as one or more of the content sites 190.

In one use case example, a user may view a number of televisions and electronic catalog hosted by a content site 190. In this use case example, the user may purchase one of the hygiene products. With some recommendation algorithms, a recommendation may be generated for a hygiene product based on the user's browsing activity at the content site 190. However, the owner of the content site 190 may desire to not include hygiene products in advertisements to the user on the network page 802 because, for example, an advertisement for the hygiene product may embarrass the user or the user may consider such an advertisement inappropriate for viewing by other members of the user's household (e.g., children) who may be looking over the user shoulder or to whom the user may be showing the network page 802.

Using the process 700, the seed behavior that relates to the hygiene product can be de-associated with the user for a recommendation generation process or an advertisement generation process. The content site can identify that a purchase occurred, but not the type of item purchased. In such a case, the process 700 would filter seed behavior across a set of categories, including the category that includes the hygiene products. Thus, instead of an advertisement being generated for a hygiene product, an advertisement 810 may be directed towards a television based on its popularity in the electronic catalog of the content site 190. Further, books may be advertised as part of the advertisement 812 to the user based on browsing activity of the user occurring a threshold period of time subsequent to the purchase of the hygiene product.

X. Terminology

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

It is to be understood that not necessarily all such advantages can be achieved in accordance with any particular embodiment of the embodiments disclosed herein. Thus, the embodiments disclosed herein can be embodied or carried out in a manner that achieves or optimizes one advantage or group of advantages as taught herein without necessarily achieving other advantages as may be taught or suggested herein.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry or digital logic circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Disjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A method of generating personalized recommendations, the method comprising:
   accessing, by a recommendation system associated with a first entity and implemented by computer hardware, user activity data of a target user using a first network site associated with a second entity to determine that the target user purchased an item from the first network site, the user activity data corresponding to interactions with item data for items in an electronic catalog corresponding to the first network site, and the user activity data including interactions with item data for the purchased item;

identifying, by the recommendation system, from the user activity data, seed behavior corresponding to activity by the target user with respect to the first network site, the user activity data comprising first browsing activity of the target user with respect to the electronic catalog and second browsing activity of the target user with respect to the electronic catalog, the first browsing activity corresponding to a first item category in the electronic catalog and the second browsing activity corresponding to a second item category in the electronic catalog;

attempting to determine, by the recommendation system, an item type of the purchased item based on item catalog data provided by the second entity for items in the electronic catalog;

in response to determining that the item type cannot be determined, filtering, by the recommendation system, the seed behavior to remove activity data for a plurality of categories including at least the first browsing activity and the second browsing activity from the seed behavior for a first time period to obtain a first filtered seed behavior;

in response to determining that the item type corresponds to the first item category, filtering, by the recommendation system, the seed behavior to remove activity data corresponding to the first item category including at least the first browsing activity from the seed behavior for the first time period and a second time period that differs from the first time period, and filtering user seed behavior for a plurality of categories including at least the second browsing activity from the seed behavior for the second time period to obtain a second filtered seed behavior, the second time period comprising an abbreviated version of the first time period; and outputting a recommendation generated based at least in part on one of the first filtered seed behavior or the second filtered seed behavior.

2. The method of claim 1, wherein the second time period is less than the first time period and at least partially overlaps the first time period.

3. The method of claim 1, wherein, in response to determining that the item type corresponds to the first item category, the method further comprises:

generating, by the recommendation system, the recommendation for the target user using the second filtered seed behavior; and outputting, by the recommendation system, the recommendation for presentation to the target user.

4. The method of claim 3, wherein outputting the recommendation for presentation to the target user comprises providing the recommendation to a second network site for presentation to the target user as an advertisement, the second network site associated with a third entity.

5. The method of claim 1, wherein the first time period extends from a first point in time corresponding to an initial identifiable activity performed by the target user with respect to the first network site to a second point in time subsequent to the purchase of the purchased item.

6. The method of claim 1, wherein the second time period extends from a first point in time prior to the purchase of the purchased item to a second point in time subsequent to the purchase of the purchased item.

7. A system for generating personalized recommendations, the system comprising:

a seed behavior collector comprising computer hardware, the seed behavior collector configured to access user activity data of a target user using a first network site to determine whether the target user purchased an item from the first network site, the purchased item represented by item data in an electronic catalog;

a related history filter comprising computer hardware, the related history filter configured to:

identify from the user activity data, seed behavior corresponding to activity by the target user with respect to the first network site, the user activity data comprising browsing activity of the target user with respect to a plurality of item categories in the electronic catalog;

determine whether an item category can be identified for the purchased item;

filter from the seed behavior, in response to determining that the item category cannot be identified for the purchased item, the browsing activity of the target user for the plurality of item categories for a first time period to remove activity data occurring during the first time period for the plurality of item categories to obtain a first filtered seed behavior;

attempt to identify the item category corresponding to the purchased item, in response to determining that the item category can be identified, wherein the item category comprises one of the plurality of item categories; and filter from the seed behavior, in response to identifying the item category, browsing activity of the target user for the item category for the first time period and a second time period, and browsing activity for the remaining item categories from the plurality of item categories for the second time period to remove activity data occurring during the second time period for the remaining item categories from the plurality of item categories to obtain a second filtered seed behavior, wherein the remaining item categories do not correspond to the purchased item and wherein the second time period comprises an abbreviated version of the first time period; and a recommendation engine configured to output a recommendation generated based at least in part on one of the first filtered seed behavior or the second filtered seed behavior.

8. The system of claim 7, wherein the recommendation engine is further configured to:

generate the recommendation for the target user using the second filtered seed behavior; and output the recommendation for presentation to the target user.

9. The system of claim 8, wherein the recommendation engine is further configured to provide the recommendation to a second network site for presentation to the target user as an advertisement, the second network site associated with a different entity than the first network site.

10. The system of claim 8, wherein the recommendation engine is further configured to generate the recommendation by:

identifying a set of items based at least in part on the second filtered seed behavior;

accessing a set of selection factors for selecting an item to recommend; and selecting the item to recommend from the set of items based at least in part on the set of selection factors.

11. The system of claim 10, wherein the set of selection factors include one or more of the following: a conversion rate for one or more items from the set of items; a profit margin for the one or more items; and inventory for the one or more items.

12. The system of claim 7, wherein the first time period extends from a first point in time to a second point in time, the first point in time occurring a first non-zero amount of time prior to the purchase of the purchased item and the second point in time occurring a second non-zero amount of time subsequent to the purchase of the purchased item.

13. The system of claim 12, wherein the second time period extends from a third point in time to a fourth point in time, the third point in time occurring a third non-zero amount of time prior to the purchase of the purchased item and the fourth point in time occurring a fourth non-zero amount of time subsequent to the purchase of the purchased item.

14. The system of claim 13, wherein the third point in time occurs after the first point in time and the fourth point in time occurs before the second point in time.

15. The system of claim 7, wherein the seed behavior comprises activity by the target user with respect to the first network site usable in generating a recommendation for purchasing another item from the first network site.

16. Non-transitory physical computer storage comprising instructions stored thereon that, when executed by one or more processors, are configured to implement a system for generating personalized recommendations, the system comprising:
    a seed behavior collector configured to access user activity data of a user with respect to a first network site to determine whether the user purchased an item from the first network site;
    a related history filter configured to:
        identify from the user activity data, seed behavior corresponding to activity by the user with respect to the first network site, the user activity data comprising browsing activity of the user with respect to a plurality of item categories in an electronic catalog;
        determine whether an item category can be identified for the purchased item;
        filter from the seed behavior, in response to determining that the item category cannot be identified for the purchased item, the browsing activity of the user to remove the user activity data occurring during a first time period for the plurality of item categories for the first time period to obtain a first filtered seed behavior; and
        filter from the seed behavior, in response to determining that the item category can be identified for the purchased item, browsing activity of the user to remove the user activity data occurring during the first time period for the item category for the first time period, and browsing activity to remove the user activity data occurring during a second time period for the remaining item categories from the plurality of item categories for the second time period to obtain a second filtered seed behavior, wherein the second time period comprises an abbreviated version of the first time period; and
    a recommendation engine configured to output a recommendation generated based at least in part on one of the first filtered seed behavior or the second filtered seed behavior.

17. The non-transitory physical computer storage of claim 16, wherein the recommendation engine is further configured to:
    generate the recommendation for the user using the second filtered seed behavior; and
    output the recommendation for presentation to the user on a second network site.

18. The non-transitory physical computer storage of claim 17, wherein the recommendation engine is further configured to generate the recommendation by:
    identifying a set of items based at least in part on the second filtered seed behavior;
    accessing a set of selection factors for selecting an item to recommend; and
    selecting the item to recommend from the set of items based at least in part on the set of selection factors.

19. The non-transitory physical computer storage of claim 16, wherein the first time period extends from a first point in time to a second point in time, the first point in time corresponding to a point in time when the user registered with the first network site and the second point in time occurring a first non-zero amount of time subsequent to the purchase of the purchased item, and wherein the second period of time extends from a third point in time to a fourth point in time, the third point in time occurring a first non-zero amount of time prior to the purchase of the purchased item and the fourth point in time occurring a second non-zero amount of time subsequent to the purchase of the purchased item.

* * * * *